(12) United States Patent
Hagstrom

(10) Patent No.: US 7,884,273 B2
(45) Date of Patent: Feb. 8, 2011

(54) METHOD AND USE OF WARM-UP INSTRUCTIONAL VIDEO FOR WIND INSTRUMENT

(76) Inventor: John R. Hagstrom, 155 N. Harbor Dr., #4214, Chicago, IL (US) 60601

( * ) Notice: Subject to any disclaimer, the term of this patent is extended or adjusted under 35 U.S.C. 154(b) by 0 days.

(21) Appl. No.: 12/542,686

(22) Filed: Aug. 17, 2009

(65) Prior Publication Data

US 2010/0077906 A1    Apr. 1, 2010

Related U.S. Application Data

(60) Provisional application No. 61/136,194, filed on Aug. 18, 2008.

(51) Int. Cl.
*G09B 15/00* (2006.01)
(52) U.S. Cl. .................................................. 84/470 R
(58) Field of Classification Search ............... 84/470 R, 84/477 R, 484, 387 A, 380 R
See application file for complete search history.

(56) References Cited

U.S. PATENT DOCUMENTS 7,754,955 B2 * 7/2010 Egan ........................... 84/600

* cited by examiner

*Primary Examiner*—Kimberly R Lockett
(74) *Attorney, Agent, or Firm*—Herbert Joe

(57) ABSTRACT

An instructional system and method for students of wind instrument that include audio/video depictions for viewing by users of the system and method an instructor performing steps on a wind instrument, an animated breathing bar presented at least during a time period over which a user is to attempt to replicate the steps demonstrated by the instructor, such breathing bar to visually command a user to alternatively inhale or exhale (while producing tones on his or her wind instrument), and visual indicia instructing in textual form the step or steps to be carried out by a user. A system can include one or many steps being demonstrated and prompted for recreation by a user, as well as additional presentations, such as metronomes, interactive tuners, and the like.

2 Claims, 1 Drawing Sheet

000# METHOD AND USE OF WARM-UP INSTRUCTIONAL VIDEO FOR WIND INSTRUMENT

CITATION TO PROVISIONAL PRIORITY

This non-provisional application claims priority to U.S. Provisional Patent Application Ser. No. 61/136,194, filed 18 Aug. 2008.

BACKGROUND OF THE INVENTION

1. Field of the Invention

The present invention relates to an improved instructional video, and more specifically for students of wind instruments to warm-up.

2. Background Information

A wind instrument (technically an aerophone) is a musical instrument that contains some type of resonator (e.g., a tube) in which the sound is produced by vibrating air (usually inside the instrument). The instrument, or parts of the instrument, are shaped (often into a tube or set of tubes) so that the vibrations will be a particular length, and so a particular pitch, when the player blows into (or over) a mouthpiece, which is at the end of the resonator. The pitch is dependent on the length of the tube and by manual modifications of the effective length of the vibrating column of air. Wind instruments are made up of brass instruments and woodwind instruments. An instrument is considered brass or woodwind depending on how the player produces sound. In brass instruments, the player's lips vibrate, causing the air within the instrument to vibrate. In woodwind instruments the player either causes a reed to vibrate, which agitates the column of air (e.g., clarinet, oboe or duduk), blows against an edge or fipple (e.g., recorder), or blows across the edge of an open hole (e.g., flute).

The warm-up routine is one of the most important things that a student of any wind instrument can do. It is especially important to those desiring to become professionals, as the routine (daily) warm-up allows the student to concentrate on and refine the fundamentals of any wind instrument. The warm-up routine can begin with the playing of long or sustained tones. The playing of long tones as part of the routine warm up directly contributes to good and proper embouchure, good air stream and beautiful tone, as well as warming up one's embouchure muscles and to increase endurance.

To become technically proficient in playing any wind instrument, the production of tone must be done consciously, while breathing is done subconsciously. That subconscious action of breathing starts first as a conscious action in a warm-up (or some kind of focused developmental period each day).

The student must learn and decide when and how to inhale, and the rate of exhaling. The student must concentrate on every aspect of every relevant muscular activity in producing tone at every dynamic level throughout the entire playing range of the wind instrument. Another primary purpose of the warm up is to strengthen the muscles and tissues by which the embouchure is formed. Routine warm ups on sustained tones will increase stamina and physical response.

Despite all of the benefits from the current and various instructional or educational videos on musical instruments, there is no instructional or educational video that focuses on developing the student's fundamental habits of how he or she connects with their wind instrument, or one that gives him/her targets to emulate in the content, proportion, and sequence of warm-up and developmental exercises in developing fundamental skills in playing any wind instrument, or one that facilitates the conversion of short-term memories of form into long term memories that are deeply developed and therefore underlying the pathway toward mastery of one's instrumental playing.

SUMMARY OF THE INVENTION

In view of the foregoing, it is an object of the present invention to provide an improved method for preparing an individual for playing a wind instrument.

It is another object of the present invention to provide an improved method for preparing an individual for playing a wind instrument instructional, which method incorporates the use of interactive audio/visual instruction and feedback.

It is another object of the present invention to provide an improved instructional, warm-up video for any wind instrument that integrates an instructional calibration screen.

It is another object of the present invention to provide an improved instructional method, effected through use of a warm-up video for any wind instrument, and that integrates a visual metronome that keeps a pulse going visually without making any aural sound.

It is another object of the present invention to provide an improved instructional method for preparing an individual for playing a wind instrument, which method involves the use of video presentations to a user, in turn, involving the methodical preparation of a user's muscles for the task of playing in a way that will reduce the risk of strain or injury.

It is another object of the present invention to provide an improved instructional, warm-up video for any wind instrument that helps the student find or rediscover his or her limits of coordinated skill (in each category of focus) already achieved in one's playing in the past, and pushing those limits gradually to challenge the player's skills to grow.

It is another object of the present invention to provide an improved instructional, warm-up video for any wind instrument to reinforce the habits and reflexes underlying the successful execution of fundamental exercises by reducing the level of conscious effort required to engage and activate his/her instrument.

It is another object of the present invention to provide an improved instructional, warm-up video for any wind instrument to streamline over time the expressive power/process for the player, freeing his/her mind from too much conscious distraction by the physical process of controlling the basic instrumental skills to play with efficiency, accuracy and strength.

It is another object of the present invention to provide an improved instructional, warm-up video for any wind instrument that facilitates the conversion of short-term memories of form into long term memories that are deeply developed and therefore underlying the pathway toward mastery of one's instrumental playing.

It is another object of the present invention to provide an improved instructional, warm-up video for any wind instrument in which the audio track is of the person playing transmitted through headphones or a speaker system.

It is another object of the present invention to provide an improved instructional, warm-up video for any wind instrument that integrates a breathing bar, which is a visual representation of the qualitative motion of the inhalation and exhalation of the player's breath as it should behave to facilitate the player's coordination while strengthening the routine to sound like the person shown playing the example.

It is another object of the present invention to provide an improved instructional, warm-up video for any wind instrument that incorporates a video of a conductor with a baton visually beating the time to which the player reacts to prepare, start and stop their playing of each exercise.

It is another object of the present invention to provide an improved instructional, warm-up video for any wind instrument that helps the player self-regulate proper playing of the wind instrument during the time the video plays.

It is another object of the present invention to provide an improved instructional, warm-up video for any wind instrument that is appropriate for all skill levels, from the beginner to the advanced or professional.

It is another object of the present invention to provide an improved instructional, warm-up video for any wind instrument to properly control muscular response in achieving technical competence.

It is another object of the present invention to provide an improved instructional, warm-up video for any wind instrument to prepare the student to get used to reacting visually to a conductor.

It is another object of the present invention to provide an improved instructional, warm-up video for any wind instrument that can be readily used by any instrumental player in the world, as it has no spoken instructions.

It is another object of the present invention to provide an improved instructional, warm-up video for any wind instrument in which subtitles or overdubbing in any language can be incorporated.

It is another object of the present invention to provide an improved instructional, warm-up video for any wind instrument that is affordable, easy to use.

It is another object of the present invention to provide an improved instructional, warm-up video for any wind instrument that can save teachers much time demonstrating musical targets to be imitated.

It is another object of the present invention to provide an improved instructional, warm-up video for any wind instrument that can directly and significantly improve the playing habits in the viewer.

It is another object of the present invention to provide an improved instructional, warm-up video for any wind instrument that can help regulate the player toward a better aural and physical version for the way in which they produce sound from their wind instrument.

It is another object of the present invention to provide an improved instructional, warm-up video for any wind instrument that can systematically reduce the level of conscious effort required to engage and activate the instrument, and eventually streamline this process so the student can free up his/her mind from too much conscious distraction to thus create an efficient and accurate control of their instrument.

It is another object of the present invention to provide an improved instructional, warm-up video for any wind instrument that facilitates the student's increased efficiency and consistency by optimizing the speed and efficiency of the habit formation for how the viewer trains their use of air.

It is another object of the present invention to provide an instructional, warm-up video for any wind instrument that improves the user's mastering of the wind instrument by layering the long-term memories via repetition of efficient coordinated skills.

In satisfaction of these and related objects, the present invention is of an improved instructional, training and/or practice coaching method for preparing an individual to play a wind instrument, and involving the use of a warm-up video that establishes and improves the proper intensity and quality of the student's fundamental playing skills.

The methods involved in prompting a player through steps integral in achieving an optimal warm-up regimen, as well as to hone playing skills, minimizes the wasted effort players otherwise typically apply in practicing for lack of, among other things, a clear perception of comparatively better sounds than the player is then or otherwise producing through his or her instrument. The method of the present invention minimizes the teacher's need to work on basic elements of playing while preserving valuable lesson time for working on music and elements of creative expression—as opposed to merely habit formation for basic skills.

The subject invention, however, in other embodiments, need not achieve all these objectives and the claims hereof should not be limited to structures or methods capable of achieving these objectives.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE PREFERRED EMBODIMENT

Figure 1:
FIG. 1 shows a typical screen shot illustrating the learning tool of the invention in its preferred embodiment, particularly showing (as labeled) the novel "Breathing Bar" of the present invention/methodology.

Aside from the preferred embodiment or embodiments disclosed below, this invention is capable of other modes or constituent embodiments and of being practiced or being carried out using different technologies than those specifically discussed herein. Thus, it is to be understood that the invention is not limited in its application to the details of construction and the arrangements of components set forth in the following description or illustrated in the drawings. If only one embodiment is described herein, the claims hereof are not to be limited to that embodiment. It is to be understood that other embodiments may be utilized and structural changes may be made without departing from the scope of the invention. Moreover, the claims hereof are not to be read restrictively unless there is clear and convincing evidence manifesting a certain exclusion, restriction, or disclaimer.

The proposed invention is an improved instructional method for preparing an individual to play a wind instrument and involves use of a interactive audio/video technology. The presentation to a user (student or accomplished performer who is "going back to the basics" for maintaining fundamental skills, or seeking to correct acquired "bad habits") includes a collection of visual and audio targets to aid the student in synchronizing themselves within as they work on the fundamental aspects of their playing. To achieve this synchronization for mastering the basics, the video display presents to the user i) a content of exercises to be done, ii) a strict form to follow for those exercises, iii) a sequential order for those exercises, iv) an optimal duration for those exercises, and v) an optimal proportion of rest/recovery between each exercise.

The video presentation contains various audio and visual components within an instructional calibration screen, including a visual metronome, a reminder of the current type of exercise, a reminder of the starting key/note and a video of the instructor actually demonstrating the proper fundamental skill of that particular exercise. The combined content of the proposed invention allows any user at any skill level to identify where their skill level lies, and improve from that level by letting himself or herself to regulate himself or herself toward a better aural and physical version for the way in which they produce sound.

Also, the proposed invention solves (in the case of a student player) a teacher's erstwhile need to remain with a student for proper training, by, in effect, providing the student with a virtual version of the teach to establish and reinforce the intensity and quality of the student's image of what constitutes an improved version of their fundamental playing skills. Thus, use of the method of the present invention minimizes the wasted effort students apply toward warming up and practicing for lack of a clear image of that which represents improvement in their playing, and also minimizes the teacher's need to work on basic elements of playing in order to preserve valuable lesson time for working on music and elements of creative expression (as opposed to merely habit formation for basic skills).

The proposed invention focuses on developing the player's/viewer's fundamental habits of how he or she connects with their wind instrument, as it gives him/her targets to emulate in the content, proportion, and sequence of optimal warm-up/developmental exercises.

Specifically, the proposed invention teaches the student how to gradually develop the fundamental habits to play his/her wind instrument more efficiently and, thus, to develop more potential to powerfully capture the attention and preference of his/her audience. As the student/viewer/player progresses, the methods of the present invention, through the means of the interactive audio/video presentations, offers subsequent levels of increasing challenge and content so that beginners as well as professional players can "work out" and grow their fundamental skills—in various combinations of content and proportion—and at various levels of difficulty.

Each category of exercise within any of the warm-up videos will become more difficult (at the next subsequent level in a set of incrementally graded versions) in order to provide the appropriate level of challenge for the student/viewer to keep growing in their development strengths. These increased difficulties will be created by i) increasing the length of time specific exercises last, ii) the expansion of the note ranges covered, iii) the speed of execution (tempo), and iv) the agility/technical complexity of the notes in the exercises where speed of the player's technique is being challenges and developed.

A key component of the method of the present invention is presenting a "Breathing Bar" for use by a user. The Breathing Bar appears as a colored, preferably blue bar that lengthens (typically "moving" from a viewer's left toward the right off the screen) to show the viewer when they should be blowing air (exhaling). Alternatively, the Breathing Bar "moves" from right to left to signal when viewer that they should be inhaling. The Breathing Bar's motion to cue the viewer to inhale/exhale is synchronized exactly with the player pictured and recorded playing the exercise and this air motion is intended to be imitated an ultimately made of habit by the viewer. Without exception, every exercise played in any moment of this invention's timeline is synchronized with the breathing bar.

By the use of the timing, direction, and speed of its motion, the breathing bar therefore helps the viewer to be strictly aware of how their own breathing is behaving as a function of their attempt to imitate the player pictured and recorded playing in the video. When the breathing bar moves at a faster rate, it is a signal to the viewer that their inhalation/exhalation should also increase in its flow rate in or out in deference to the direction of the bar's travel. When the player pictured in the video is not playing, the breathing bar is still moving, and this is meant to instruct the viewer that their air should still be flowing inward or outward in alignment with the bar's direction.

The breathing bar is not meant to define an exact quantity of air to be used, since this will vary slightly from player to player because of their instrument and individual physiology. One of the most helpful qualitative reminders the breathing bar provides is the need for the air to be constantly moving either inward or outward. This facilitates efficiency and accuracy in one's habits on any instrument. Inexperienced players often forget this detail of form in their warm-up and suffer the hurtful symptoms (e.g., inefficiency, inaccuracy) during the rest of their practicing and performances.

Another helpful qualitative reminder that the breathing bar provides is the instruction for the air to be exhaled immediately (and not too gradually) when the first note of each exercise begins. Inexperienced players tend to blow too slowly at the start of any note after inhaling. As such, the breathing bar gives the viewer a constant visual example of qualitative motion that reminds the viewer to be cognizant of their own air flow and to correct it accordingly to be in better qualitative alignment with the example shown in the video.

Over many repetitions, the breathing bar optimizes the speed and efficiency of the habit formation for how the viewer trains their use of air, and therefore playing their instrument with greater efficiency and consistency.

For example (using the following categories of challenge, though more categories are included in the warm-ups of the instructional video):

LONG TONES: Long tones will last longer as they get more difficult, and the "Breathing Bar" at the bottom of the screen will therefore move more slowly from left to right to accommodate the longer duration of time to travel its full span during the course of the note being played. The second window illustrates the note of this exercise as it is about to be completed. At this point, the blue breathing bar is now almost completely to the right. As the notes last longer, the viewer/player may be required to take a quick additional breath and continue the length of the note before resting for the allotted time before the next exercise begins. The duration of the rest time between exercises may also be increased or decreased to facilitate the next level of challenge for the student/viewer.

FLEXIBILITY: Other screens will involve exercises to challenge the student's/player's ability to change accurately and rapidly between notes with the same fingering and having the first note of the exercise begin on, for example, the note "F". Such an exercise will become more difficult in subsequent versions of the warm-up by challenging the student/player to make the accurate and rapid note changes, for a longer duration of time, change between notes that are farther apart (requiring more agility), and covering a more extended range on the instrument.

SCALES: Scales are a series of notes played in a particular key in a linear stepwise motion, ascending or descending. This category will provide additional challenges for the player by increasing the length of duration of the scales, the range over which the scale will cover (extending further higher and/or lower), the speed at which the scale is played, and the pattern of how and when the scale changes direction from going upward or downward. The visual depiction of any of these levels of increasing difficulties will visually be (in any one instant of the screen's capture) very similar to these FIGURES.

Once the specific skills of coordination and strength are achieved through the warm-up exercises of the present invention to target individual skills to be learned, the fundamental routine should be repeated daily in order to facilitate habit formation to a depth that will allow the player to automatically enforce the skills demonstrated in the warm-up video. This is true no matter what level the player is at—more advanced players are merely adding more difficulty, but simultaneously investing in the reflexivity of those habits as well.

The necessity to solidify one's fundamental skills on a daily basis cannot be overemphasized, and perhaps one of the "objects" for this application can be a more clarified emphasis on the present invention's capability to help solidify more automatically/subconsciously the fundamental habits of the player through the daily repetition of its use.

In this way, the present invention is more than just a "how to" video for basic skills. One does need to initially focus on those specifics, but, when used as intended, the majority of the time the viewer spends using this system will be functioning to reduce the conscious effort required to achieve the same level of playing quality that had previously been more consciously consuming.

There are many different ways to construct basic exercises in these categories, using specific note patterns, variances in the durational length of each exercise, note range, speed of execution, etc. In other words, the warm-up initially is a period of discovery/awareness toward a more advanced and efficient restructuring of the student's coordinated skill. Once the student is able to consciously notice and adjust his/her output to be in alignment with the example set forth in the warm-up video, however, the rest of the utility function of the present invention is to retain and deepen the reflexivity of these skills.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

I claim:

1. A method for creating a system for instructing in the playing of a wind instrument comprising the steps of:

creating first visual indicia reproducible on audio/video playing means, said first visual indicia for directing a user of said system in steps to be carried out in playing said wind instrument;

recording into audio/video media recording means a first audio/video segment for later first playing on said audio/video playing means, said first playing presenting to a user of said system a depiction of an instructor demonstrating said steps using an example of said wind instrument;

recording into audio/video media recording means a second audio/video segment for later second playing on said audio/video playing means, said second playing presenting to said user of said system a depiction of an animated breathing bar, said breathing bar alternatively lengthening or shortening in depicted length over one or more respective time periods during such later second playing as correspond, respectively, to time periods during which a viewer is to be instructed during said second playing to exhale in the course of producing tones with said wind instrument and inhale during cessation of said producing tones for obtaining breath for subsequent, further producing of tones;

compiling said first visual indicia, said first audio/video segment, and said second audio/video segment for playing on a said audio/video playing means for depiction of said first visual indicia, said first audio/video segment, and said second audio/video segment to a user of said system in sequences and for durations whereby a user of said system is first presented with said depiction of an instructor performing said steps using an example of said wind instrument, followed by the user being second presented with said depiction of said animated breathing bar over a time period and depicting said lengthening or shortening as corresponds to instructions for said user, when attempting to reproduce said steps demonstrated by said instructor, to alternatively effect said exhale and said inhale, said first visual indicia being presented to said user at least as said user is said second presented.

2. The method of claim 1 wherein said compiling further includes steps whereby a second depiction of said animated breathing bar is caused to be presented to said user as said user is said first presented, with said second depiction of said animated breathing bar depicting said expanding or contracting as temporally corresponds to said instructor respectively exhaling and inhaling during said instructor's demonstration of said steps.

* * * * *